July 27, 1926.
R. LEARMONT
1,593,876
STEERING WHEEL THROTTLE AND SPARK CONTROL
Filed April 29, 1925
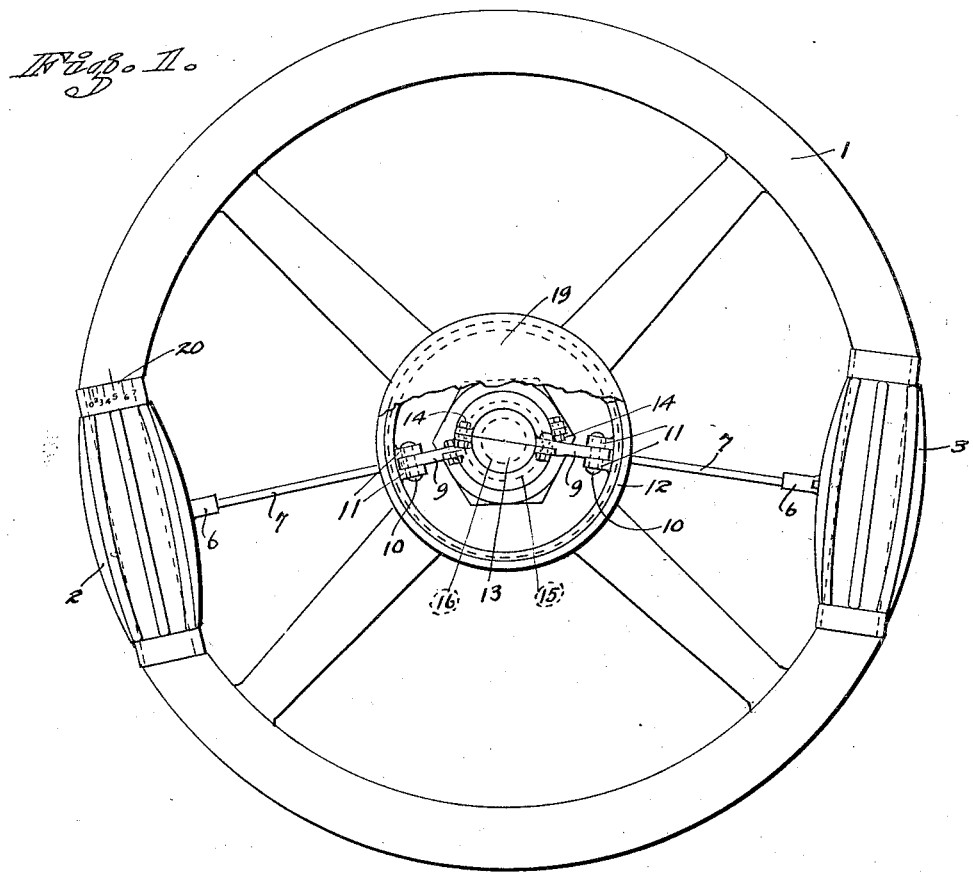
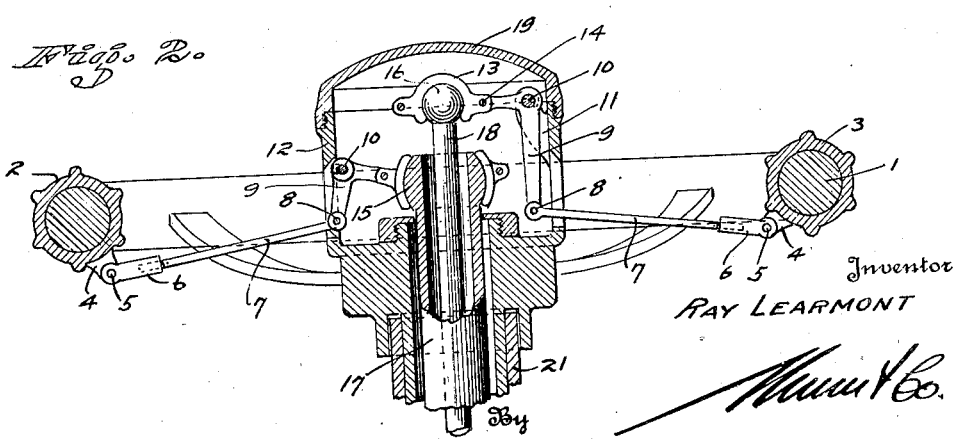
Inventor
RAY LEARMONT
Attorneys Patented July 27, 1926.

1,593,876

UNITED STATES PATENT OFFICE.

RAY LEARMONT, OF BOOROWA, NEW SOUTH WALES, AUSTRALIA.

STEERING-WHEEL THROTTLE AND SPARK CONTROL.

Application filed April 29, 1925. Serial No. 26,781.

This invention relates to motor vehicles, motor boats and other automatic devices using a steering wheel, and particularly to the relation between the steering wheel and the motor control levers.

The objects of this invention are to provide a throttle control and also a spark control which may be operated by the driver's hands without in any way shifting the position of the hands on the wheel or releasing one of the hands from the wheel in order to manipulate an auxiliary lever as at present necessary, and thus by providing control means operated from the wheel grip entirely dispensing with the usual foot control or accelerator.

The invention is realized in the construction shown in the accompanying drawing and in which Figure 1 is a plan view of an automobile steering wheel showing my invention embodied therein, and Figure 2 is an enlarged central part of the wheel and steering post shown in section.

Briefly described, the invention consists in providing on the wheel rim a revolvable grip or grips for the driver's hands and connections therefrom adapted to operate the throttle or also the spark upon twisting the particular grip connected to either of these controls.

To carry this out it is essential that the throttle and spark rods should run through the wheel post and that they should not be affected by turning of the steering wheel to steer the vehicle.

In the drawing, 1 represents a steering wheel rim with two independently revolvable grips 2 and 3 located thereon in the normal position of a rider's hands on the wheel so that in taking the wheel he will grasp it upon the revolvable grips.

The construction of these grips may assume many forms, but the simple form shown consists in providing a short straight space on the rim with a shell or tubular gripping section mounted thereon as shown clearly in Figure 2. This makes the rim itself continuous with the grips revolvably positioned on it, and the grips may be of metal, hard rubber or any other suitable composition and each grip has a lug 4 at the under side near one end pivotally bolted at 5 to the yoke 6 of a rod 7 extending toward the center of the wheel.

This rod is threaded to the yoke so that its effective length may be varied to suit, and at its inner end it is pivotally bolted at 8 to a bell crank lever 9 pivoted loosely at 10 to a bracket 11 projecting inwardly from a small circular housing 12 secured to the revolving portion of the post or wheel.

The housing 12 therefore turns when the wheel is turned, and by twisting either of the hand grips its rod is moved back and forth and gives motion to its bell crank.

The upper leg of the bell crank is provided with a split ball socket 13 half of which may be removed by loosening the screws 14, and the sockets of the respective cranks engage, respectively, balls 15 and 16 formed on the upper ends of concentric sliding control rods 17 and 18, one of the rods, 17, being hollow with the other rod 18 passing through it so that they are concentrically arranged with both axes coincident with the axis of the steering wheel.

One of the rods represents the throttle control and the other the spark control and they may be individually connected at the lower ends by any desired form of linkage to serve their respective purposes.

The exact form of lower connections is of no great importance as it will vary with the particular automobile upon which my combined steering and control wheel is used, and as such linkage is well known and is not a feature of the invention is not shown in the drawings, but the point of emergence of the rods from the lower end of the steering post 21 may take a duplicate form to the upper end shown if desired.

The balls 15 and 16 formed on the ends of the rods are spaced sufficiently to permit either rod to work up and down the necessary distance to serve its purpose without interfering with the other rod.

A bell shaped cap 19 is preferably screwed over the small circular housing to cover the levers and ball connections, and the revolvable grips may each be graduated against the wheel rim as shown at 20 so as to indicate its position and thereby the advancement of the spark or opened condition of the throttle, as the case may be.

In contemplating my invention as above set forth it is apparent that only one grip may be provided so as to control the throttle only if desired, also that many modifications may be made within the spirit of the invention, and any such are intended to be covered in my appended claim.

I claim:

In an automobile, a steering post with a handwheel at the upper end thereof, a throttle control rod extending through the wheel into the steering post and movable longitudinally therein, a hand grip positioned on the rim of the wheel and revolvable relative thereto, a link connection from the grip extending toward the center of the wheel, a bell crank pivotally supported to move with the wheel, one arm of the crank connected to the link and the other to the rod whereby, upon revolving the grip, the rod will be moved longitudinally within the post.

RAY LEARMONT.